United States Patent Office 3,317,480
Patented May 2, 1967

3,317,480
ADDUCTS OF ISOCYANATES AND AROMATIC ANHYDRIDE CARBOXYLIC ACIDS
Charles A. Fetscher, Short Hills, N.J., and Edward Schonfeld, New York, N.Y., assignors to Nopco Chemical Company, Newark, N.J., a corporation of New Jersey
No Drawing. Filed June 7, 1963, Ser. No. 286,198
13 Claims. (Cl. 260—77.5)

This invention relates to new and novel aromatic amide anhydrides and more particularly to a class of compounds produced by condensing an aromatic anhydride with an isocyanate. The new and novel compounds of this invention are extremely useful as epoxy curing agents, grease bases, and as intermediates in the preparation of plasticizers, lubricants and alkyd paints.

The use of anhydrides as curing agents for epoxy resins is well known in the art. Phthalic, tetrahydro phthalic, chloroendic, maleic and other anhydrides are widely used. The cured resins, especially those cured with aromatic anhydrides are characterized by good electrical properties and high heat distortion temperatures. Recently, pyromellitic dianhydride (PMDA) has come into use as a crosslinking agent. Because the molecule contains two anhydride groups, instead of one, it has a higher crosslinking potential and is, therefore, superior as a curing agent in place of the older mono-anhydrides. However, at the high temperatures necessary to distribute the anhydride throughout the resin to be cured, the anhydride has the disadvantage of reacting too rapidly with the resin to be cured causing gelation of this resin before the anhydride is uniformly distributed in the resin. Furthermore, the cost of pyromellitic anhydride is very high, thus sharply limiting its application in the resin industry.

In producing cured high density resin systems having very high softening temperatures and increased solvent resistancy, the mono-anhydrides have not proved effective due to their limited anhydride functionality. In order to produce very high density resin systems having very high softening temperature and very high solvent resistancy, it is preferable to utilize curing agents having as high an anhydride functionality as possible. Workers in the field have tried to utilize trianhydrides such as mellitic trianhydride as curing agents in producing very high density resins having high softening temperatures and increased resistance to solvents. However, these polyanhydrides have little or no solubility in the resins and solvents with which they are used and their extremely high melting point precludes the possibility of fusion to promote compatibility with the resin to be cured. Moreover, heretofore it has been impossible to successfully and economically manufacture anhydrides having more than three functional anhydride groups per molecule.

In order to produce high density cured resins having high softening temperatures and increased solvent resistancy, others in the field have sought to effect changes in the physical properties of the cured resins by various means including the use of high and low curing temperatures, increased curing times, variations in the molecular weight of the resin used, and different concentrations and mixtures of simple anhydride curing agents such as various combinations of phthalic and pyromellitic anhydride. While such means have been successful in enabling those skilled in the art to improve some of the properties of the resin systems in which these curing agents are incorporated, they do not provide a great variation in the density, softening temperatures and solvent resistance of the resins produced by this method of curing over the resins cured by the conventional methods of curing. This is true since the curing agent has an anhydride functionality of not more than two.

It is an object of this invention to provide new and novel aromatic amide anhydrides.

It is an object of this invention to produce new and novel aromatic amide anhydrides which can be used as curing agents for epoxy resins.

It is an object of this invention to produce new and novel aromatic amide anhydrides having an anhydride functionality greater than two.

It is an object of this invention to provide new and novel aromatic anhydride curing agents that can be easily distributed in the resins and solvents in which they are used.

It is an object of this invention to provide new and novel curing agents which can be utilized to produce high density resin systems which have a high temperature of softening and a high solvent resistancy.

Other objects of this invention will in part be obvious and will in part appear hereinafter.

We have found that a new and novel class of aromatic amide anhydrides containing any desired degree of anhydride functionality can be produced by reacting under anhydrous conditions, an aromatic anhydride containing a free or reactive carboxyl group, said anhydride group and said carboxyl group being directly connected to the aromatic ring, such as trimellitic anhydride with an organic isocyanate containing compound containing at least one free or reactive isocyanate group at temperatures of from 20° C. to 150° C., said compound being supplied in an amount sufficient to provide from about 0.9 to about 1.2 moles of the aromatic anhydride compound for every free or reactive isocyanate group contained within said organic isocyanate containing compound. In accordance with this invention, the anhydride functionality of the aromatic amide anhydride may be varied to any desired degree depending upon the number of free and unreacted isocyanate groups contained within the compound which is reacted with the aromatic anhydride. The new and novel aromatic amide anhydrides of this invention are useful as curing agents, grease bases, and as intermediates in the preparation of plasticizers, lubricants, alkyd paints and water soluble resins or as ion exchange resins. In utilizing these new and novel aromatic amide anhydrides as resin curing agents, we have found that many of these compounds are more compatible than conventional known dianhydrides in the resins to be cured and in the solvent in which they are used. Furthermore, these anhydrides react with the resin to be cured in such a manner that premature gelation does not occur. If the aromatic amide anhydrides of this invention containing at least three functional anhydride groups are utilized as curing agents for resins, the resins produced therefrom have extremely high densities and a very high softening temperature and solvent resistancy.

The phenomena whereby anhydrides can be produced having an anhydride functionality of greater than two by reacting an aromatic anhydride containing a free or unreacted carboxyl group as well as the anhydride group directly connected to the aromatic ring with a compound containing at least three free or unreacted isocyanate groups in an amount sufficient to provide 0.9 to 1.2 moles of the anhydride per unreacted or free isocyanate group contained within the compound, is attributable to the fact that the free isocyanate group reacts with the free carboxyl group of the anhydride compound and not, as might be expected with the anhydride group. In this manner, the anhydride group is not destroyed but preserved during this reaction. The buildup of free anhydride groups is due to the reaction of the polyisocyanate compound with the carboxyl groups of the aromatic anhydride, whereby the isocyanate groups within the compound form a bridge between the molecules of aromatic anhydride. Hence the anhydride functionality of the desired aromatic amide anhydride will depend upon the amount of free and unreacted isocyanate groups contained within the compound that is reacted with the aromatic anhydride. Therefore, if an aromatic amide anhydride having four functional or reactive anhydride groups is desired, the aromatic anhydride should be reacted with a compound containing four free isocyanate groups. Hence in accordance with this invention, we can produce an anhydride having any desired degree of anhydride functionality. By the term aromatic anhydrides containing a free carboxyl group as used throughout the specification and claims, we mean an aromatic compound wherein the anhydride group and the carboxylic group are directly attached to the same aromatic ring such as in the case of the following compounds:

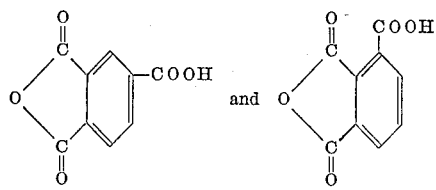

The amide anhydrides containing two free anhydride groups may be prepared in accordance with this invention by reacting approximately 1.8 to 2.4 moles, preferably about two moles, of aromatic anhydride containing one free carboxyl group with one mole of a compound containing two free isocyanate groups under anhydrous conditions. These amide anhydrides can be illustrated by the following formula:

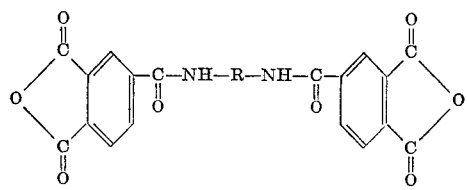

wherein R is an organic residue from the isocyanate compound. As seen from the above formula, the free isocyanate group reacts with the acid groups of the anhydride to form a bridge between the molecules of aromatic anhydride producing in this case, a compound having two free or unreacted groups.

The aromatic amide anhydride of this invention can be prepared by mixing, under anhydrous conditions, an aromatic anhydride containing a free and unreacted carboxyl radical with a compound containing one or more free isocyanate groups at room temperature. Generally, it is desirable to speed up the reaction of the reaction of the free isocyanate groups with the aromatic anhydride. Therefore, higher temperatures such as from 80° C. to 150° C. are preferably employed. Generally, however, it is seldom necessary to utilize temperatures of over 150° C. since no improved results are obtained and such high temperatures are not economical. If desired, the isocyanate and/or the aromatic anhydride may be dissolved in a suitable solvent such as a hydrocarbon solvent which will not react with the reactive anhydride or carboxyl groups of the aromatic anhydride or with the isocyanate compound. The time for the reaction to be completed will take from about a few minutes to 10 hours or more depending upon the temperature, the reactants, and the solvents used. Of course, it must be borne in mind that aromatic anhydrides such as trimellitic anhydride and compounds containing free isocyanate groups are readily subject to deterioration in the presence of water and water vapor. Therefore, the reactants must be kept under anhydrous conditions before, during and after the reaction. Special care must be taken to keep the reaction conditions anhydrous, if elevated temperatures are to be employed therein. This can be accomplished easily by reacting the products in a closed vessel under a blanket of an inert dry gas which will not react with any of the reactants such as nitrogen, argon, carbon dioxide, etc.

In the preparation of the aromatic amide anhydride of this invention, any compound containing at least one free isocyanate group can be used. Generally, it is preferred to utilize a compound containing at least two or more free or unreacted isocyanate groups so as to form an aromatic amide anhydride containing two or more free or unreacted anhydride groups due to the bridging produced by the isocyanate-containing compound. Representative examples of mono isocyanates found useful in our invention include the aliphatic isocyanate compounds such as ethyl isocyanate, methyl isocyanate, hexamethyl isocyanate and the aromatic isocyanate compounds such as toluene isocyanate, naphthalene isocyanate, and xylene isocyanate. Typical diiosocyanate compounds which may be utilized in accordance with this invention are tetramethylene diisocyanate, pentamethylene diisocyanate, hexamethylene diisocyanate, ethylene diisocyanate, cyclohexylene 1,2-diisocyanate, m-phenylene diisocyanate, p-phenylene diisocyanate, 4,4'-diphenylmethane diisocyanate, 1,5-naphthalene diisocyanate, toluene diisocyanate (including the 2,4 and 2,6 isomers). Triisocyanates which may be utilized in accordance with this invention include toluene triisocyanate, naphthalene triisocyanate, the triisocyanate formed by condensing one mole of trimethylol propane with three moles of toluene diisocyanate, the triisocyanate formed by reacting one mole of glycerine with three moles of toluene diisocyanate, etc.

Typical isocyanate resins containing two or more free and unreacted isocyanates which can be utilized to react with the aromatic anhydride in accordance with this invention are the prepolymers formed by reacting polyols, polyesters, and polyethers having at least two free hydroxy groups with any polyisocyanate such as toluene diisocyanate in an amount sufficient to provide at least two isocyanate groups per free hydroxyl group.

Examples of typical polyols which can be reacted with a diisocyanate compound having at least two free and unreacted isocyanate groups to form the prepolymers include glycerine, trimethylol propane, trimethylol pentane, trimethylol ethane, tetramethylol butane, castor oil, pentaerythritol, etc. Polyethers which can be utilized to form prepolymers (which can be utilized in accordance with this invention by reacting the polyether with a polyisocyanate) include polyoxyethylene glycols having molecular weights of 200 to 4,000, polyoxypropylene glycols having molecular weights of 400 to 4,000, such as the Pluracol P series of Wyandotte Chemical Corp.; and block copolymers prepared by the sequential addition of ethylene oxide to polyoxypropylene glycols. The copolymers can be represented by the formula $$HO(C_2H_4O)_a(C_3H_6O)_b(C_2H_4O)_cH$$

The molecular weight of the base, i.e., the polyoxypropylene portion of the molecule can vary, e.g., from about 600 to 2,500. Hence, in these instances, each $b$ in the above formula can vary from about 10 to 43. The oxyethylene content can vary from, e.g., 10% to 20% by weight of the total. Exemplary of these materials having a molecular weight of between 800 and 1,000 for the base portion of the molecule, i.e., the polyoxypropylene portion, and from 10% to 20% by weight of the ethylene oxide in the molecule are materials having a molecular weight of between 2,101 and 2,500 and having from 10% to 20% by weight of ethylene oxide in the molecule. Other polyethers which may be utilized in this invention are the ethylene oxide and propylene oxide condensates of glycerine, 1,2,6-hexanetriol, trimethylol propane, trimethylol butane, pentaerythritol, etc.

Polyesters which can be reacted with an isocyanate compound to form prepolymers containing two or more free isocyanate groups in accordance with this invention can be obtained by reacting one or more polyhydric alcohols having at least two hydroxyl groups with one or more di or polybasic acids or their anhydrides, said acid being present in an amount sufficient to provide a final polyester having two or more free or reactive hydroxy groups. Exemplary of the polyhydric alcohols which can be used in producing the polyesters are ethylene glycol, diethylene glycol, trimethylol propane, trimethylol ethane, glycerol, pentaerythritol, sorbitol, mannitol, etc. and mixtures of the above. Of course, when a diol is used, there may be present some amount of triol, tetrol, or other polyhydric alcohol having a functionality greater than two in order to incorporate branching into the polyester. Exemplary of the dibasic acid and anhydrides which can be used in the production of the polyester are malonic acid, oxalic acid, adipic acid, sebacic acid, azelaic acid, itaconic acid, terephthalic acid, isophthalic acid, phthalic anhydride, maleic anhydride, etc., and their mixtures.

In order to more fully illustrate the nature of this invention and the manner of practicing the same, the following examples are presented. These examples are given merely as illustrations of the invention and are not to be construed in a limiting sense.

In the examples which follow, unless otherwise indicated, all percentages given are percents by weight.

EXAMPLE I

This example is directed to the preparation of an aromatic amide dianhydride in accordance with this invention.

A slurry was prepared by dispersing 38.4 grams (0.2 mole) of trimellitic anhydride in 150 grams of ethyl acetate. This slurry was prepared in a four-neck 500 ml. flask which had the following instruments inserted therein: a stirrer, a dropping funnel, a thermometer, and a cooling condenser. This slurry was kept under anhydrous conditions by maintaining a dry nitrogen atmosphere above the slurry in the flask. 17.4 grams (0.1 mole) of toluene diisocyanate (80% by weight of the 2,4 diisocyanate, 20% by weight of the 2,6 diisocyanate) were dissolved in 50 grams of ethyl acetate. This solution containing the toluene diisocyanate was then slowly added dropwise to the slurry in the flask with constant agitation of the resulting mixture. The resulting mixture, which was a milky white slurry upon the completion of the addition of the toluene diisocyanate solution, was heated to a temperature ranging from between 75° C. to about 80° C. for one and one-half hours. During this period, the color of the slurry slowly changed to a bright yellow and carbon dioxide was given off indicating that the toluene diisocyanate was reacting with the trimellitic anhydride. After this period, the heated mixture was cooled to room temperature and 500 ml. of hexane was added to the mixture to precipitate from the slurry, the product formed by the reaction of the toluene diisocyanate and trimellitic anhydride. The precipitate was then filtered out of the mixture and dried at the temperature of 50° C. under a vacuum of 10 mm. of mercury. The dry precipitate thus obtained weighed 28 grams. It was an amorphous mass which was then pulverized into a yellow powder. This powder was titrated with aqueous NaOH to determine the percent anhydride in the powder. From the titration, it was ascertained that the product was the reaction product of toluene diisocyanate and trimellitic anhydride and contained two free or unreacted anhydride groups. The yield of this product was 86% of the theoretical.

EXAMPLE II

This example illustrates the use of the dianhydride resin prepared in Example I to cure an epoxy resin. A solution was prepared by mixing the following ingredients in a beaker at room temperature:

(a) 6.58 grams of the powdered dianhydride produced in Example I,
(b) 26 grams of an epoxy resin formed by reacting Bisphenol A and epichlorohydrin, said resin having an equivalent weight of 485 (said resin sold under the trade name of "Epon 1001" by Shell Chemical Company),
(c) 5 grams of an epoxy resin formed by reacting Bisphenol A and epichlorohydrin, said resin having an equivalent weight of 1775 (said resin sold under the trade name of "Epon 1007" by Shell Chemical Company),
(d) 7.5 grams of methyl isobutyl hexane,
(e) 2.0 grams of methyl ethyl ketone,
(f) 12.5 grams of toluene,
(g) 6.0 grams of xylene,
(h) 21.0 grams of diethylene glycol diacetate.

This solution was applied by means of a Bird Applicator to a 6 inch by 3 inch metal panel. The coated metal panel was then baked in an oven for one-half hour at 180° C. The heated panel was then allowed to cool to room temperature. This coating on the panel was found to be very smooth and hard and passed a 4H pencil hardness test.

EXAMPLE III

This example is directed to the use of the dianhydride compound of Example I as a grease base in accordance with our invention.

15 grams of the powdered dianhydride produced in Example I were added to 25 grams of methyl ethyl ketone, producing a slurry. To this slurry there was added 85 grams of napthenic base oil having a viscosity of 320 Saybolt Universal seconds at 100° F. so as to form a dispersion. A second dispersion was prepared by adding 13.5 grams of hydrogenated tallow amine (Armeen HTD—a primary amine containing approximately 25% by weight of hexadecyl amine, 70% by weight of octadecyl amine and 5% by weight of octadecenyl amine) to 12 grams of methyl ethyl ketone under constant agitation. This second dispersion was added under constant stirring to the first dispersion containing the naphthenic base oil and the slurry containing the dianhydride of Example I in methyl ethyl ketone. This mixture was heated under constant agitation to a temperature of about 180° C. After 60 minutes at this temperature the mixture was rapidly cooled. This rapidly cooled product was a number zero grease (a soft solid) of approximately 360 ASTM Grease Penetration. The type of grease and its penetration was determined by ASTM test—D217–60T.

EXAMPLE IV

This example is directed to preparing a mono anhydride utilizing octadecyl isocyanate according to this invention.

50 grams of trimellitic anhydride was added to 300 grams of a mixture consisting of 50% by weight of methyl ethyl ketone and 50% by weight of xylene in a 500 ml. flask which had the following instruments inserted therein: a stirrer, a dropping funnel, a thermometer and a cooling condenser. This mixture formed a milk white slurry. The internal atmosphere of the flask above the slurry was dry nitrogen. The temperature of the slurry was then raised to reflux (94° C.). At this temperature, 76.1 grams of octadecyl isocyanate (0.28 eq. NCO) was added dropwise to the slurry. After the addition of the isocyanate, the color of the slurry slowly changed from milky white to yellow and a large volume of gas ($CO_2$) was evolved, indicating that the octadecyl isocyanate was reacting with the trimellitic anhydride. Heating at reflux temperatures was continued for two hours. After this period the slurry was cooled to room temperature and a fine yellow precipitate, which was the reaction product of trimellitic anhydride and octadecyl isocyanate, settled out of the slurry. The precipitate was removed from the slurry by filtration. The yield of precipitate was 90 grams which is 78% of the theoretical yield.

EXAMPLE V

This example is directed to utilizing an isocyanate to produce an aromatic amide anhydride having two free anhydride groups according to this invention.

105 grams of PPG-1205 (polypropylene glycol having a molecular weight of about 1,000 and a hydroxyl number of 106.6) were dissolved in 210 grams of a solvent consisting of 50% by weight methyl ethyl ketone and 50% by weight xylene. This solution was added dropwise to 34.8 grams of toluene diisocyanate (80% by weight of the 2,4 isomer and 20% by weight of the 2,6 isomer) under a dry nitrogen atmosphere at a temperature of from about 45–50° C. The temperature was maintained at from about 45–50° C. during this addition. The resulting solution was then heated at 75° C. for four and one-half hours so as to react the isocyanate with the PPG-1205 so as to form a prepolymer containing free isocyanate groups. The solution was then heated to 85° C. for two hours. A small sample of the solution was removed and it was titrated with di-n-butyl amine to determine the free isocyanate content of the prepolymer. The free isocyanate content determined by this method was 2.69% by weight of the solution which indicated that the prepolymer contained two free isocyanate groups. 48 grams of trimellitic anhydride were then slowly added to this solution while the solution was heated to the reflux temperature under a nitrogen atmosphere for two hours. At the end of this two hour period, the color of the solution slowly changed to a bright yellow due to the reaction of the trimellitic anhydride with the prepolymer. Upon cooling, the solution solidified into a yellow gel-like substance which contained the dianhydride formed by reacting the prepolymer with the trimellitic anhydride. A small sample of the raw gel-like substance was dried in a 50° C. oven so as to drive off all the volatile materials. The dried sample was tested in the manner outlined in Part C of Example XI. From the analysis it was determined that the reaction product contained two free anhydride groups.

EXAMPLE VI

This example is directed to an aromatic anhydride having two free anhydride groups formed by means of prepolymer containing two free isocyanate groups.

140 grams of a polyester, prepared from diethylene glycol and adipic acid, having a molecular weight of 2,244 and a hydroxyl number of 50 was dissolved in 372 grams of a solvent containing 50% by weight methyl ethyl ketone and 50% by weight xylene. This solution was then added dropwise to 21.7 grams of toluene diisocyanate (a mixture containing 20% by weight, 2,6 isomer and 80% by weight of the 2,4 isomer) which was previously heated to 50° C. under a nitrogen atmosphere. A temperature of from 55–65° C. was maintained during this addition. The resulting solution was then heated at 75° C. for three hours so as to react completely with the polyester and the isocyanate to form a prepolymer having two free isocyanate groups. 25.5 grams of trimellitic anhydride was added to this solution and it was then heated at the reflux temperature for two hours. At the end of this two hour period, the color of the solution turned orange which indicated that the prepolymer had reacted with the polyester. Upon cooling, the solution solidified into a gel-like solid. This gel-like solid contained the dianhydride formed by reacting the prepolymer with trimellitic anhydride. A small sample of the raw gel-like substance was dried in an 80° C. oven so as to drive off all of the volatile materials. The dried sample was tested in the manner outlined in Part C of Example XI. From the analysis it was determined that the reaction product contained two free anhydride groups.

EXAMPLE VII

This example is directed to producing an epoxy coating utilizing pyromellitic dianhydride as a curing agent.

An epon based coating was prepared by mixing the following:

(a) 26 grams Epon 1001 (an epoxy resin formed by reacting Bisphenol A and epichlorohydrin, said resin having an equivalent weight of 485),
(b) 5 grams of Epon 1007 (an epoxy resin formed by reacting Bisphenol A and epichlorohydrin, said resin having an equivalent weight of 1775),
(c) 7.5 grams of methyl isobutyl ketone,
(d) 2.0 grams of methyl ethyl ketone,
(e) 12.5 grams of toluene,
(f) 6.0 grams of xylene, and
(g) 21.0 grams of Cellosolve acetate.

The ingredients were thoroughly intermixed and a clear solution was obtained. To this clear solution there was added 3.05 grams of pyromellitic dianhydride as a curing agent. The resin mixture containing the curing agent was thoroughly agitated to disperse the curing agent throughout the coating mixture. The curing agent was not soluble in the resin mixture. A thin film of the resin mixture containing the curing agent was applied to metal panels using a Bird Applicator. The dimensions of each of the metal panels were 6 inches by 3 inches. The coated panels were placed in an oven having a temperature of 180° C. for one-half hour in order to cure the coatings thereon. The cured coatings on the panels were hard and clear and easily passed a 4H pencil hardness test.

EXAMPLE VIII

This example is directed to producing an epoxy coating utilizing the curing agents of this invention.

A coating mixture similar to that prepared in Example VII was prepared, however 12.4 grams of the solid gel which contained the aromatic amide anhydride prepared in Example IV was used in place of the pyromellitic anhydride as a curing agent. The resin mixture containing the curing agent was thoroughly agitated to disperse the curing agent throughout the coating mixture. The curing agent was soluble in the resin mass. A thin mixture of the resin containing the curing agent prepared in Example IV was applied to metal panels, each of said panels having dimensions of 6 inches by 3 inches. The heated panel was then baked in an oven for one-half hour at 180° C. The heated panel was then allowed to cool to room temperature. The coating on the panel was found to be very smooth and very hard and easily passed a 4H pencil hardness test.

EXAMPLE IX

A coating mixture similar to that prepared in Example VII was prepared, however, 23.35 grams of the raw gel-like substance containing the dianhydride prepared in Example V was used in place of the pyromellitic anhydride. The coating on the panel was found to be very smooth and very hard and easily passed a 4H pencil hardness test.

EXAMPLE X

A coating mixture similar to that prepared in Example VII was prepared, however, 68.43 grams of the raw gel-like substance containing the dianhydride prepared in Example VI was used in place of the pyromellitic anhydride. The coating on the panel was found to be very smooth and very hard and easily passed a 4H pencil hardness test.

EXAMPLE XI

This example is directed to preparing an aromatic amide anhydride having four free anhydride groups according to this invention.

(A) *Preparation of the isocyanate prepolymer*

24.65 grams (0.25 equivalent of OH) of PeP-450 (a propylene oxide adduct of pentaerythritol having a molecular weight of about 400) was dissolved in 45.5 grams of methyl ethyl ketone. To this solution, there was added 43.5 grams (0.50 equivalent of NCO) of toluene diisocyanate (80% by weight of the 2,4 diisocyanate and 20% by weight of the 2,6 isomer). This mixture was kept under anhydrous conditions by maintaining a dry nitrogen atmosphere above the mixture. The temperature was maintained at 30° C. during the addition of the toluene diisocyanate to the solution. After all of the toluene diisocyanate had been added to the solution, the solution was maintained at a temperature of 30° C. for an additional hour. After this period, the solution was heated to a temperature of about 70° C. Heating was continued at this temperature for 3½ hours so as to react the toluene diisocyanate with the propylene oxide adduct of pentaerythritol so as to form a prepolymer. This solution containing the prepolymer was cooled to room temperature. A small sample of this solution was removed and titrated with di-n-butylamine to determine its NCO content. The NCO content determined by titration was 9.25% by weight of the solution which indicated that the prepolymer contained four free or reactive isocyanate groups.

(B) *Preparation of the tetrafunctional anhydride*

A mixture was prepared by mixing 47.7 grams of trimellitic anhydride (0.25 equivalent of COOH), 50 grams of toluene and 50 grams of methyl ethyl ketone. This mixture was added to all of the prepolymer formed in Part A so as to form a slurry. This slurry was refluxed at a temperature of about 79° C. for about 3 hours to react the prepolymer with the trimellitic anhydride. During this period an orange solution formed which indicated that the trimellitic anhydride had reacted with the prepolymer solution. After this period, the solution was cooled to room temperature. At this temperature, 22 grams of solids precipitated out of solution. The solids which were unreacted trimellitic anhydride were removed from the solution by filtration. A small portion of the solution was dried overnight in an 80° C. oven to drive off the volatile material. After drying the resultant product was a yellow solid.

(C) *Determination of the anhydride and carboxyl content of the reaction product*

A hydrolysis of the anhydride groups and titration for total acid value of the hydrolyzed reaction product was determined by placing 4 grams of the solution prepared in Part B in a flask containing 50 ml. of distilled water and 20 ml. of pyridine. The flask was heated on a steam bath for 20 minutes so as to hydrolize all of the anhydride groups contained within the reaction product product of Part B. After this period, the flask was removed and allowed to cool to room temperature. Three drops of phenolphthalein indicator were placed in the flask. The contents of the flask were titrated with 0.3 N sodium hydroxide solution. The titration was carried out until a pink colored end point, which indicated that all of the free acid contained within the reaction product had been neutralized with sodium hydroxide. From the amount of sodium hydroxide utilized to reach the end point, the total weight of the acid and anhydride groups contained within the reaction product of Part B was calculated.

Esterification and titration of the reaction product of Part B was carried out by first placing 4 grams of the solution prepared in Part B in a dry flask containing 50 ml. of anhydrous methanol. The flask was then refluxed at a temperature of about 64° C. for a period of 20 minutes so as to esterify the anhydride groups contained within the sample. In this manner, only the anhydride groups of the reaction product of Part B were esterified and not the carboxyl groups. After this period, the flask was cooled to room temperature. Three drops of phenolphthalein indicator were placed in the flask. The contents of the flask were titrated with 0.3 N sodium hydroxide solution. The titration was carried out until a pink colored end point, which indicated that all of the free acid which was in the esterified reaction product was neutralized with soduim hydroxide. From the amount of sodium hydroxide utilized to reach the end point, the total weight percent of the free acid groups contained within the esterified reaction product of B was calculated. By subtracting this value from the value of the total weight of acid and anhydride groups contained within the reaction product which was determined through hydrolysis, the total weight percent of anhydride groups within the reaction product of Part B was calculated. From subtracting twice the weight percent of anhydride groups contained within the reaction product of Part B from the weight percent of acid and anhydride groups contained within the product of Part B, which was determined by hydrolysis, the weight percent of free carboxyl groups was calculated.

The weight percent of anhydride groups contained within the solution of Part B containing the product, determined by the above method, was about 13% by weight of solid product contained within the solution and the weight percent of carboxylic groups contained within the solution containing the reaction product of Part B was about 3.0% by weight of the the solid product contained within the solution. The theoretical weight percent of anhydride groups and theoretical weight percent of carboxyl groups of the above aromatic amide tetra anhydride is respectively about 17% and 0% by weight. Hence, by comparing the results obtained from the compound produced by the method of this example with the theoretical values, it can be seen that the compound produced in Part B contained four free anhydride groups.

Having described our invention, what we claim as new and desire to secure by Letters Patent is:

1. A method of preparing aromatic amide anhydrides comprising reacting, under anhydrous conditions,
    (A) an organic isocyanate selected from the group consisting of
        (1) an aliphatic monoisocyanate,
        (2) an aliphatic polyisocyanate,
        (3) an aromatic monoisocyanate,
        (4) an aromatic polyisocyanate, and
        (5) a prepolymer which is the reaction product of
            (a) a compound having at least two free hydroxyl groups selected from the group consisting of
                (I) a polyol, which is a polyhydric alcohol having at least two free hydroxyl groups,
                (II) a polyester which is the reaction product of a polyol which is a polyhydric alcohol having at least two free hydroxyl groups and an organic acid selected from the group consisting of dibasic acids, poly basic acids and anhydrides thereof, and
                (III) a polyether selected from the group consisting of polyoxyethylene glycols, polyoxypropylene glycols, copolymers thereof, and polyols which are polyhydric alcohols having at least three hydroxyl groups condensed with at least one member of the group consisting of ethylene oxide and propylene oxide, and
            (b) a polyisocyanate selected from the group consisting of aliphatic polyisocyanates and aromatic polyisocyanates in sufficient amounts to provide at least two isocyanate groups per each free hydroxyl group present in said compound so that all of the hydroxyl groups in said compound are reacted with isocyanate groups and the sole reactive groups present in said prepolymer being reactive isocyanate groups, and (B) with from about 0.9 to 1.2 moles per reactive isocyanate group contained within said isocyanate, of an aromatic anhydride of the formula

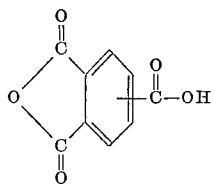

2. The method of claim 1 wherein said reaction is carried out in the presence of an anhydrous inert organic solvent.

3. The method of claim 1 wherein said compound is toluene diisocyanate.

4. A method of preparing new and novel aromatic amide anhydrides having at least three free anhydride groups comprising reacting under anhydrous conditions, an organic isocyanate containing compound containing at least three reactive isocyanate groups, the sole reactive groups present in said compound being reactive isocyanate groups, with from 0.9 mole to 1.2 moles per reactive isocyanate group contained within said compound, of an aromatic anhydride of the formula:

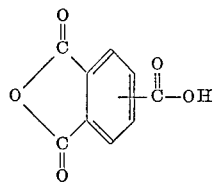

5. The method of claim 4 wherein said reaction takes place in an anhydrous inert organic solvent.

6. The method of claim 4 wherein said compound is a prepolymer which is the reaction product of about one mole of trimethylol propane and about three moles of toluene diisocyanate, the sole reactive groups present in said prepolymer being reactive isocyanate groups.

7. The method of claim 4 wherein said compound is a prepolymer which is the reaction product of about one mole of pentaerythritol with about four moles of toluene diisocyanate, the sole reactive groups present in said prepolymer being reactive isocyanate groups.

8. A new and novel aromatic amide anhydride having the formula:

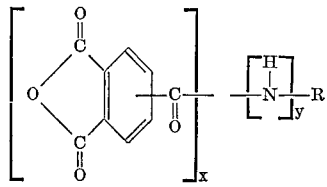

wherein $y$ varies from about 2 to about 4, $x$ varies from about 0.9 to about 1.2 times the value of $y$, and R is an organic residue of an organic isocyanate which is a prepolymer, said prepolymer being the reaction product of (A) a compound having at least two free hydroxyl groups selected from the group consisting of
 (1) a polyol, which is a polyhydric alcohol having from two to four free hydroxyl groups,
 (2) a polyester, which is the reaction product of
  (a) a polyol, which is a polyhydric alcohol having from two to six free hydroxyl groups,
  and (b) an organic acid selected from the group consisting of saturated and unsaturated aliphatic dibasic acids and anhydrides thereof having from two to ten carbon atoms, terephthalic acid, isophthalic acid and phthalic anhydride, said (a) and (b) being present in sufficient amounts to provide at least two free hydroxyl groups, and
 (3) a polyether having a molecular weight of from 200 to 4000 selected from the group consisting of polyoxyethylene glycols, polyoxypropylene glycols, copolymers thereof and polyethers which are polyhydric alcohols having from three to four hydroxyl groups condensed with at least one member of the group consisting of ethylene oxide and propylene oxide, and (B) a polyisocyanate selected from the group consisting of aliphatic polyisocyanates and aromatic polyisocyanates having from two to three isocyanate groups, said (A) and (B) being present in sufficient amounts to provide at least two free isocyanate groups per each free hydroxyl group present in said compound so that all of the hydroxyl groups in said compound are reacted with isocyanate groups and the sole reactive groups present in said prepolymer are reactive isocyanate groups.

9. The new and novel amide anhydride of claim 8 in which said organic isocyanate is the reaction product of said polyether and a polyisocyanate selected from the group consisting of aliphatic polyisocyanates and aromatic polyisocyanates having from two to three isocyanate groups and the sole reactive groups present in said prepolymer are reactive isocyanate groups.

10. The new and novel aromatic amide anhydride of claim 8 in which said organic isocyanate is the reaction product of said polyester and a polyisocyanate selected from the group consisting of aliphatic polyisocyanates and aromatic polyisocyanates having from two to three isocyanate groups and the sole reactive groups present in said prepolymer are reactive isocyanate groups.

11. The new and novel aromatic anhydride of claim 8 in which the value of $y$ is 3 and the value of $x$ varies from about 0.9 to about 1.2 times the value of $y$.

12. The new and novel aromatic amide anhydride of claim 8 in which the organic isocyanate is a prepolymer which is the reaction product of about one mole of trimethylol propane and about three moles of toluene diisocyanate and the sole reactive groups present in said prepolymer are reactive isocyanate groups.

13. The new and novel aromatic amide anhydride of claim 8 in which said organic isocyanate is a prepolymer which is the reaction product of about one mole of pentaerythritol and about four moles of toluene diisocyanate and the sole reactive groups present in said prepolymer are reactive isocyanate groups.

References Cited by the Examiner

UNITED STATES PATENTS

| | | | |
|---|---|---|---|
| 3,140,299 | 7/1964 | Loucrini | 260—346.3 |
| 3,182,073 | 5/1965 | Loucrini | 260—346.3 |

OTHER REFERENCES

Otvos et al., Chemical Abstracts, vol. 55 (1961), column 13,309.

ALEX MAZEL, *Primary Examiner.*

HENRY JILES, *Examiner.*